US008626674B2

(12) United States Patent
Whitehouse

(10) Patent No.: US 8,626,674 B2
(45) Date of Patent: Jan. 7, 2014

(54) INTEGRATED SHIPPING LABEL AND CUSTOMS FORM

(75) Inventor: Harry T. Whitehouse, Portolo Valley, CA (US)

(73) Assignee: PSI Systems, Inc., Palo Alto, CA (US)

( * ) Notice: Subject to any disclaimer, the term of this patent is extended or adjusted under 35 U.S.C. 154(b) by 0 days.

(21) Appl. No.: 12/923,988

(22) Filed: Oct. 19, 2010

(65) Prior Publication Data

US 2011/0161249 A1 Jun. 30, 2011

Related U.S. Application Data

(62) Division of application No. 11/165,647, filed on Jun. 23, 2005, now Pat. No. 7,844,553.

(60) Provisional application No. 60/584,801, filed on Jun. 30, 2004.

(51) Int. Cl.
*G06Q 30/00* (2012.01)
(52) U.S. Cl.
USPC .......................................................... 705/331
(58) Field of Classification Search
USPC .......................................................... 705/331
See application file for complete search history.

(56) References Cited

U.S. PATENT DOCUMENTS

| | | | |
|---|---|---|---|
| 5,319,562 A | 6/1994 | Whitehouse | |
| 5,341,505 A | 8/1994 | Whitehouse | |
| 5,452,654 A | 9/1995 | Connell et al. | |
| 5,454,038 A | 9/1995 | Cordery et al. | |
| 6,005,945 A | 12/1999 | Whitehouse | |
| 6,482,085 B1 * | 11/2002 | Fabel .............................. | 462/25 |
| 6,633,316 B1 | 10/2003 | Maddalozzo et al. | |
| 7,458,612 B1 | 12/2008 | Bennett | |
| 2001/0013025 A1 | 8/2001 | Ananda | |
| 2002/0026430 A1 | 2/2002 | Ryan | |
| 2002/0120475 A1 * | 8/2002 | Morimoto .......................... | 705/4 |
| 2002/0156688 A1 | 10/2002 | Horn et al. | |
| 2003/0101143 A1 | 5/2003 | Montgomery et al. | |
| 2003/0101147 A1 | 5/2003 | Montgomery et al. | |
| 2003/0101148 A1 | 5/2003 | Montgomery et al. | |
| 2003/0105704 A1 | 6/2003 | Sundel | |
| 2003/0163447 A1 * | 8/2003 | Sandman .......................... | 707/1 |
| 2004/0093312 A1 * | 5/2004 | Cordery et al. ............... | 705/401 |
| 2005/0131843 A1 * | 6/2005 | Sansone et al. ............... | 705/410 |

OTHER PUBLICATIONS

Fernberg, Patricia M. "A Mail Service Expressly for Business (A Large Company's Mail Service Use of Express Mail)" Modern Office Technology, v32, n5, p. 68(2). May 1987. ISSN: 0746-3839.
Foreign Trade Online. Archive date: Aug. 29, 2002. http://web.archive.org/web/20020829153303/http://foreign-trade.com/reference/hscode.cfm?cat=I.
Nigeria-law.org, Import Prohibition Order. http://www.nigeria-law.org/ImportProhibitionOrder2004.htm.

* cited by examiner

*Primary Examiner* — Allen J Jung
(74) *Attorney, Agent, or Firm* — Pillsbury Winthrop Shaw Pittman LLP

(57) ABSTRACT

The systems and methods described herein relate generally to the integration of a shipping label with a customs form to provide a single label having postage, addressing, customs and other information for international shipping. In one embodiment, a method for generating an international shipping a package comprises the steps of providing shipping information associated with the package, the information comprising address information of the origin, address information of the destination, postage information including a postage amount due to a post service and a customs form number unique within the post service; processing a shipping label having the shipping information displayed thereon; and affixing the shipping label to the package.

22 Claims, 12 Drawing Sheets

United States Postal Service
Customs Declaration and Dispatch Note - CP72

The item/parcel may be opened officially. Please print and press hard. You are making multiple copies.

CP21126807US
CP211268076US

From

| Sender's Name | Your Name | | Sender's Customs Reference (if any) | Insured Number |
|---|---|---|---|---|
| Business | | | | Insured Amount (US$)|SDR Value |
| Street | 123 Street Lane | | | |
| City | Anytown | State MD | ZIP Code® 12345 | |
| Country | | | | |

To

| Addressee's Name | SGT Joe Soldier | | Importer's Reference - Optional (if any) (Tax Code/VAT no/Importer code) |
|---|---|---|---|
| Business | ATTN: Any Soldier | | |
| Street | 1st Bdg. 2nd IN | | Importer's Telephone/Fax/Email (if known) |
| Postcode | | City APO AE 12345 | |
| Country | Iraq | | |

| Detailed Description of Contents(1) | Qty.(2) | Net Weight(3) lb. oz. | Value (US$)(5) | For Commercial Senders Only |
|---|---|---|---|---|
| | | | | HS Tariff Number(7) | Country of origin of goods(8) |
| Undershirts | 8 | | $15 | |
| Snacks (chips) | 1 | | $3 | |
| Magazines | 6 | | $20 | |
| | Total Gross Wt. (4) | | Total Value (6) $38 | Postage and Fees (9) |

Check One ☒ Airmail/Priority ☐ Surface/Nonpriority

Check One (11) ☒ Gift ☐ Commercial sample ☐ Other
☐ Documents ☐ Returned goods   Explanation:

Sender's instructions in Case of Nondelivery (16)
☐ Treat as abandoned
☐ Return to Sender -
NOTE: Item subject to return charges at sender's expense.
☒ Redirect to Address Below:
Give to any Clergy Comments (11)(e.g. goods subject to quarantine, sanitary/phytosanitary inspection or other restrictions)

| License Number(s) (12) | Certificate Number(s) (13) | Invoice Number (14) |
|---|---|---|

Date and sender's signature(15)
Your Signature

Mailing Office Date Stamp

I certify that the particulars given in this customs declaration are correct and that this item does not contain any dangerous article prohibited by legislation or by postal or customs regulations.

PS Form 2976-A, January 2004    Do not duplicate the form without USPS approval.    1-Customs Declaration 60, 70, 80, 90

FIG. 5

| | | | | | | | |
|---|---|---|---|---|---|---|---|
| CP 614 990 009 US | | | | | | | |

| From | FIRSTNAME LASTNAME<br>FIRM<br>ADDRESS1<br>ADDRESS2<br>URBANIZATION<br>CITY ST 12345-6789<br>USA | To | ADDRESS1<br>ADDRESS2<br>ADDRESS3<br>ADDRESS4<br>ADDRESS5<br>46807 PUERTO VALLARTA JALISCO<br>MEXICO | | | | |
|---|---|---|---|---|---|---|---|
| Contents<br>DOCUMENTS | | Nondelivery<br>Instructions | Return to Sender<br>[Note: Subject to return charges at sender's expense] | | | | |
| Detailed description of contents | | | Qty. | Weight<br>lb. oz. | Value<br>(US$) | HS Tariff<br>number | Country<br>of Origin |
| 12345678901234567980132456798013245678901 | | | 100 | 10 10 | 1.00 | 123451 | USA |
| 12345678901234567980132456798013245678902 | | | 101 | 11 11 | 2.00 | 123452 | USA |
| 12345678901234567980132456798013245678903 | | | 102 | 12 12 | 3.00 | 123453 | USA |
| 12345678901234567980132456798013245678904 | | | 103 | 13 13 | 4.00 | 123454 | USA |
| 12345678901234567980132456798013245678905 | | | 104 | 14 14 | 5.00 | 123455 | USA |
| Insured Number  12345678901234567890012 | | | | Total Weight<br>15 15 | Total Value (US$)<br>15.00 | SDR Value<br>14.92 | |
| Insured Amount (US$)   400.00 | | | | | | | |
| I, the undersigned, whose name and address are given on the item, certify that the particulars given in this declaration are correct and that this item does not contain any dangerous article or articles prohibited by legislation or by postal or customs regulations. | | | | | | | |
| Sender's signature | | | Date | | | | |

Global Airmail Parcel Post — 510

FIG. 6

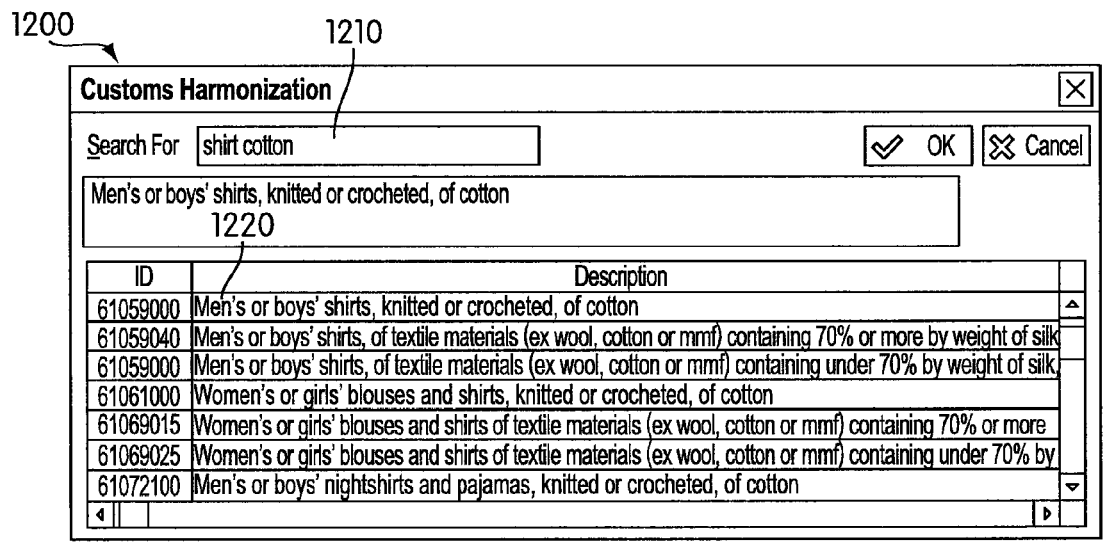
FIG. 12A
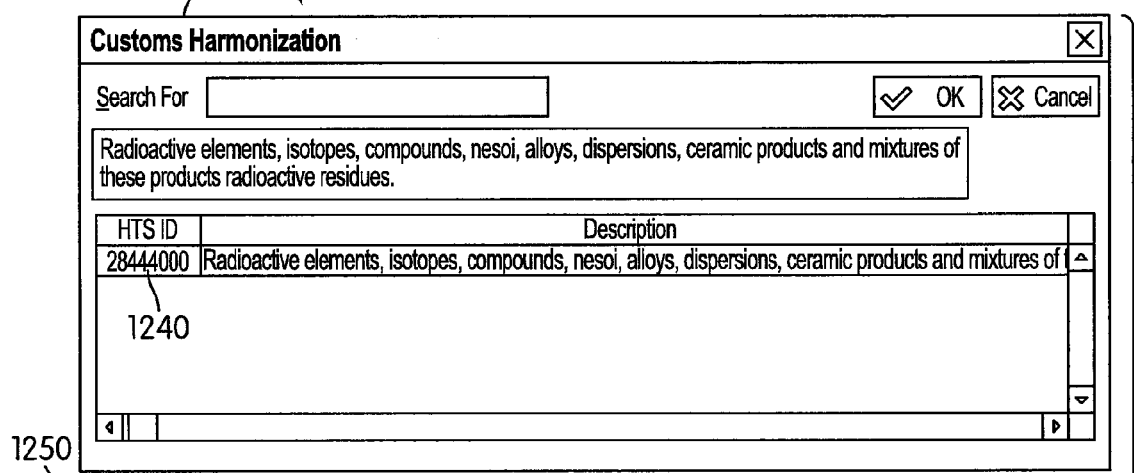
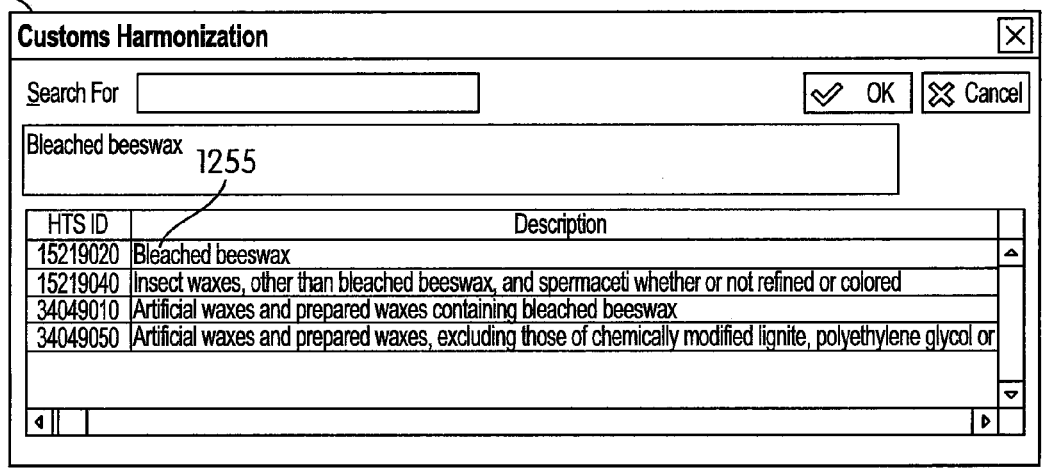
FIG. 12B

INTEGRATED SHIPPING LABEL AND CUSTOMS FORM

CROSS-REFERENCE TO RELATED APPLICATIONS

This application is a divisional of U.S. patent application Ser. No. 11/165,647, entitled "Integrated Shipping Label and Customs Form," filed Jun. 23, 2005, which issued as U.S. Pat. No. 7,844,553 on Nov. 30, 2010, and which claims the benefit of U.S. Provisional Patent Application Ser. No. 60/584,801, entitled "Integrated Shipping Label and Customs Form," filed Jun. 30, 2004, the contents of which are hereby incorporated by reference in their entirety.

FIELD OF THE INVENTION

The systems and methods described herein relate generally to the integration of a shipping label with a customs form to provide a single label having postage, addressing, customs and other information for international shipping.

BACKGROUND INFORMATION

The current procedure for preparing an international package for shipping involves a number of time-consuming steps. First, the shipping label must be generated. The typical minimum amount of information is the destination address and the sender's address. Secondly, some form of US postage must be affixed to the package. This could be conventional stamps, a postage meter strip from a conventional meter, a PVI postage strip issued by a US Post Office, or digital or "Information Based Indicia" postage (sometimes referred to as "PC postage"). Online postage was first described in U.S. Pat. No. 5,319,562 to Whitehouse, issued Jun. 7, 1994. A subsequent patent, U.S. Pat. No. 6,005,945 to Whitehouse, issued Dec. 21, 1999, described an extension of the Online postage concept—a centralized postage system premised on Web or Telephonic Milli-Transactions. The contents of the above-referenced U.S. Patents are hereby incorporated by reference in their entirety.

Thirdly, the US Postal Service, along with the Universal Postal Union ("UPU") and the World Customs Organization ("WCO"), has historically required a separate and distinct customs declaration form, which must be affixed to the package. One of the simplest customs and declaration forms 10 is the PS 2976 (alternately referred to as the CN22), a representative diagram of which is shown in FIG. 1. The form 10 repeats the sender 20 and recipient 30 address information, and adds details 40 as to the contents of the package including value and classification (Gift, Sample, Documents, Other). The newer forms, shown below, include a 6 digit Harmonization Schedule ("HS") Number which represents the product using an internationally-established classification system A similar form 60, shown in FIG. 2, the PS 2976A (also known as the CP72) is used for certain sub-classes of mail, or when package valuation exceeds $500. The data on the 2976A is virtually the same as that on the 2976 (e.g., sender 70 and recipient 80 information and details of contents 90), but there are multiple copies (up to five) and the format is larger.

These conventional forms are time consuming to complete, and replicate much of the data on the shipping label itself. The forms must be properly matched with the shipping label and postage which, in a high volume shipping environment, can be problematic.

The right hand side of the 2976 (CN22) form 10 is designed to be separated and left at the US Post Office, which inducts the mail. The copy is stored in a manual filing system for thirty days and then discarded. In the case of the 2976A (e.g., form 60), one complete copy of the form 60 is held at the origin Post Office for thirty days. The purpose of this storage is to provide some record of the induction of the mail piece. But the storage protocol is archaic and very inefficient. If information is requested for a given package, the originating Post Office or Station must first be determined, and then a manual search of the hardcopy records must be undertaken by USPS personnel at that Post Office. The information is only retained for thirty days, which in many cases, is a shorter period of time than the overall delivery cycle (particularly in the case of Surface International mail subclasses which are transported by boat).

Accordingly, improved international shipping labels, methods of international shipping, and systems and methods for storing data associated with international shipments are desirable.

SUMMARY OF THE INVENTION

The systems and methods described herein relate generally to the integration of a shipping label with a customs form to provide a single label having postage, addressing, customs and other information for international shipping. In one embodiment, a method for generating an international shipping a package comprises the steps of providing shipping information associated with the package, the information comprising address information of the origin, address information of the destination, postage information including a postage amount due to a post service and a customs form number unique within the post service; processing a shipping label having the shipping information displayed thereon; and affixing the shipping label to the package.

In another embodiment, an online postage system configured to electronically generate an integrated shipping label comprises an end user computer, a centralized postage-issuing computer system, and a communications link connecting the end user computer with the centralized postage-issuing computer system. The end user computer is configured to transmit a request for postage indicium to the centralized-issuing computer system over the communications link, and the centralized postage-issuing computer system is configured for generating and transmitting a self-validating unique postage indicium to the end user computer over the communications link, the self-validating unique postage indicium containing a character string unique to the postal system and a digital signature derived from the unique character string. The end user computer is further configured to generate an international shipping label having a customs form and add the self-validating unique postage indicium to the international shipping label.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The details of the invention, including fabrication, structure and operation, may be gleaned in part by study of the accompanying figures, in which like reference numerals refer to like segments FIG. 1 depicts a copy of the PS 2976 customs declaration form.

FIG. 2 depicts a copy of the PS 2976A customs declaration form.

FIG. 5 depicts an exemplary embodiment of an integrated shipping label.

FIG. 6 depicts an exemplary embodiment of an integrated shipping label.

FIG. 12a depicts an exemplary embodiment of a user interface.

FIG. 12b depicts an exemplary embodiment of a user interface.

DETAILED DESCRIPTION OF THE PREFERRED EMBODIMENTS

The systems and methods described herein provide for an integrated shipping label having international shipping and customs information displayed thereon. The integrated shipping label can be used in place of the conventional shipping label and separate customs form used by post services, such as the United States Post Service ("USPS"). The integrated shipping label has a unique customs form number displayed thereon, preferably in barcode format. The unique customs form number is unique within the post service system and can have any desired shipping and customs information for the package associated with it. Furthermore, the systems and methods allow for electronically storing data associated with each package shipment. The systems and methods allow for the management of a discount service on behalf of a post service using a centralized Online postage system.

In a preferred embodiment, the systems and methods described herein can be used with the systems and methods described in U.S. Pat. No. 5,341,505, issued Aug. 23, 1994, U.S. Pat. No. 6,005,945, issued Dec. 21, 1999, U.S. patent application Ser. No. 09/990,605, filed Nov. 20, 2001, U.S. patent application Ser. No. 09/990,625, filed on Nov. 20, 2001, and U.S. patent application Ser. No. 09/990,341, which issued as U.S. Pat. No. 7,831,518 on Nov. 9, 2010. The contents of the above-referenced U.S. Patents and U.S. Patent Applications are hereby incorporated by reference in their entirety. These U.S. Patents and U.S. Patent Applications, in part, point out the value of using tracking (or delivery confirmation) numbers on domestic USPS shipments to reduce fraud, provide a refund methodology which accounts for misprints and other events outside of the user's control, and also set forth a centralized online postage system capable of use with the systems and methods described herein.

Figure 3:
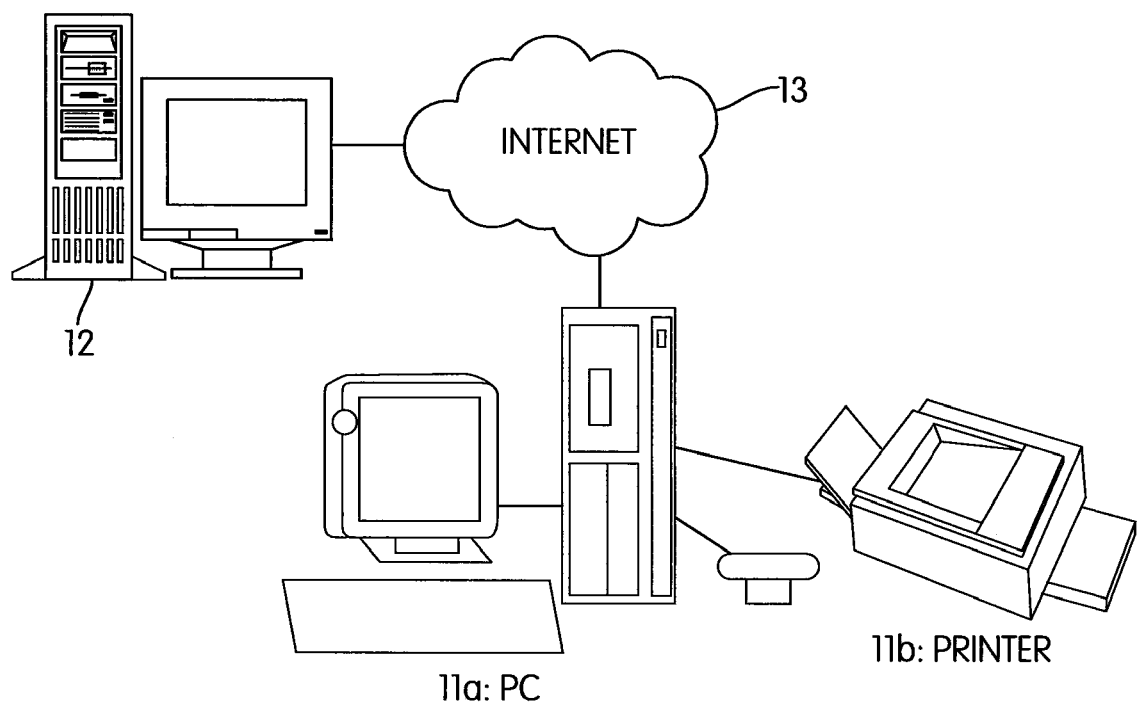
FIG. 3 is a system diagram of an online postage system known in the art.

For example, turning to FIG. 3, the computer environment in which a user may purchase online postage is shown. A user at a personal computer 11a connects to a server computer 12 configured to enable the user to electronically purchase valid postage, typically via an Internet-type network 13. The user interacts with a software program, e.g., DAZzle by Envelope Manager Software, on the personal computer 11a, downloaded from the server computer 12, installed on the personal computer 11a, and/or embedded in a web page accessible via a Web browser, that allows the user to manage postage purchases.

Figure 4:
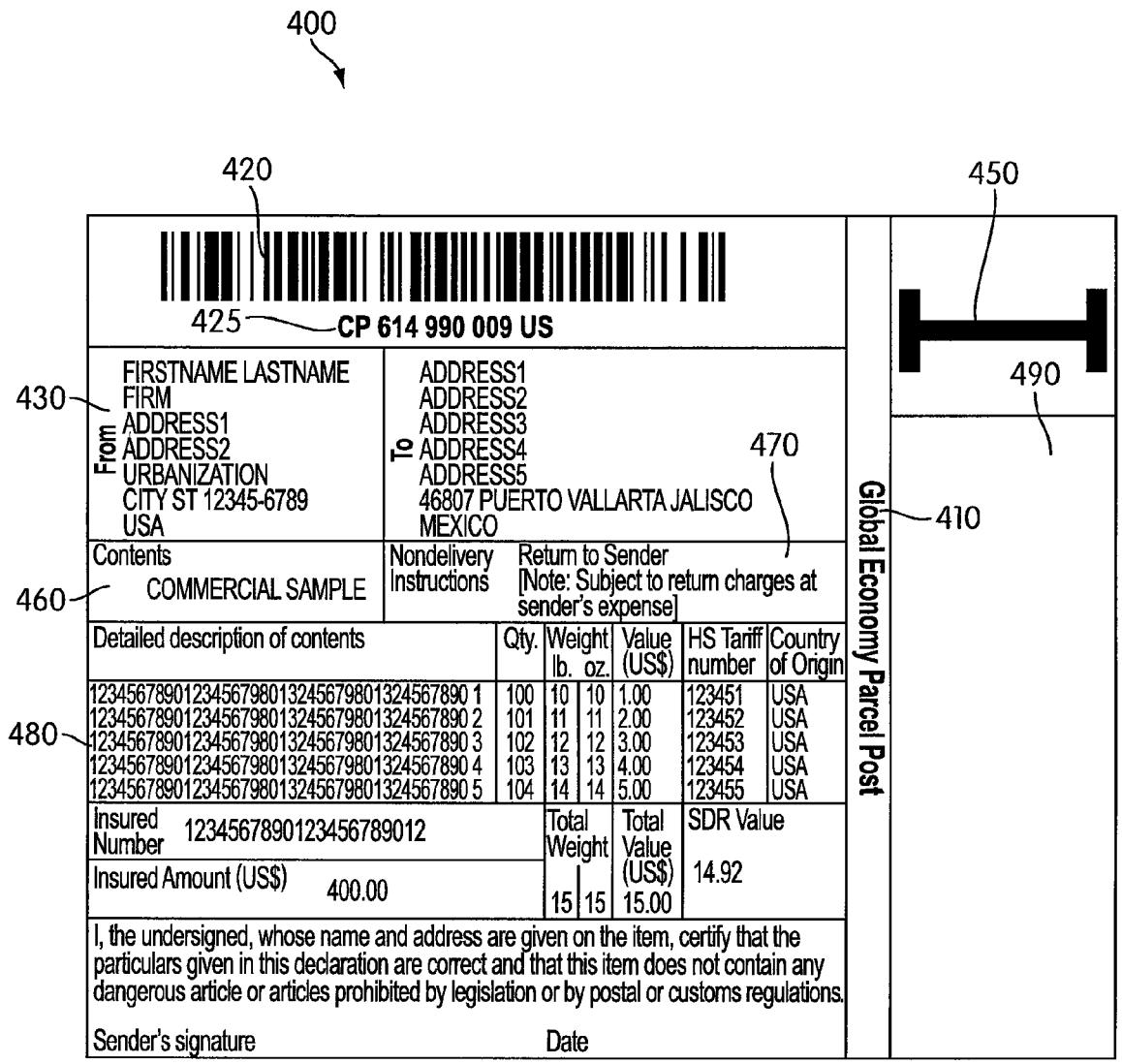
FIG. 4 depicts an exemplary embodiment of an integrated shipping label.

Turning to FIG. 4, the USPS has a general format for "universal" shipping labels, which are shipping labels for international shipments of US origin or destination, that can be generated electronically. The shipping label 400 is generally about 4×6 inches in size, landscape style, and includes a large capital "I" 450, which typically has a serif font. Also included is content identification 460, e.g., gift, documents, commercial samples, or other, and sender's instructions 470, e.g., return to sender or abandon upon non-delivery. The label 400 can also include insurance information 480, such as insurance number and insured amount. A printout of the label 400 is preferably four-ply, with two copies provided for customs declaration, one for dispatch note, and one customer copy. An online label record may also be provided. The online record contains the customs number and can be used for confirmation of acceptance by the Postal Service. The record can also be used as the proof of mailing receipt for customers who choose to bring their items to a post office for postage and acceptance. A Post Office copy is no longer required because the information is stored in a database and retained for six months.

Figure 6:
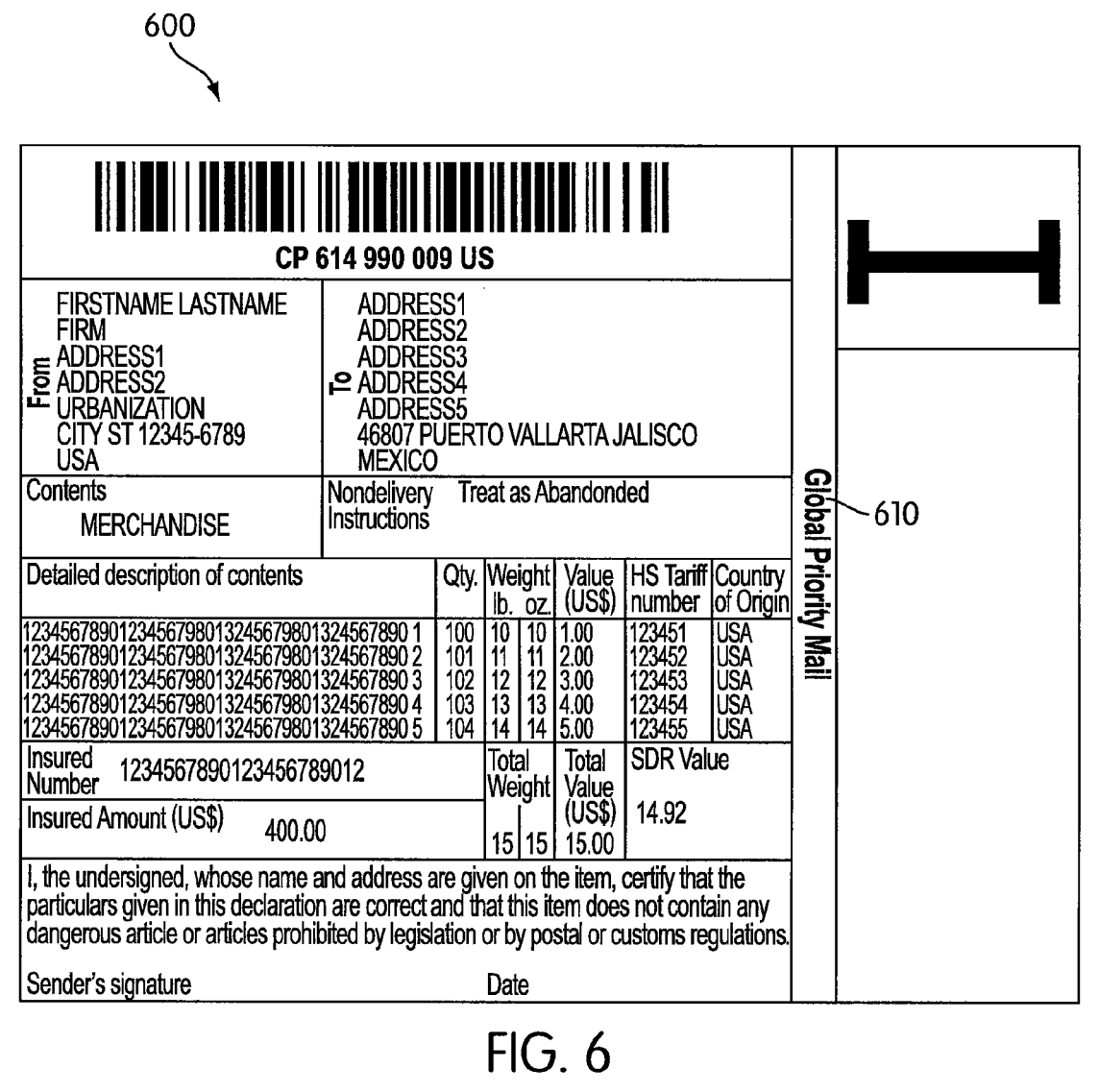

A shipping label 400 also provides service type, e.g., Global Priority Mail, Global Airmail, or Global Economy. A shipping label corresponding to each of these service types are shown in FIGS. 4-6 respectively. FIG. 4 shows a shipping label 400 corresponding to Global Economy Parcel Post 410. FIG. 5 shows a shipping label 500 corresponding to Global Airmail Parcel Post 510. FIG. 6 shows a shipping label 600 corresponding to Global Priority Mail 610.

Also included in a shipping label 400 is a barcode 420, typically a Code U128 type barcode. The barcode 420 typically appears above the address segment 430 as shown in FIG. 4. The barcode 420 includes a customs form tracking number, e.g., 2976-A, assigned to uniquely identify the mail piece. Below the barcode 420 are human readable numbers 425, which are also used to identify the mail piece. For label 400 graphics, 200 dots per inch ("dpi") is preferably used and can be in graphic image file ("GIF"), tagged image file ("TIF"), or portable document ("PDF") format.

Postage can be paid with postage stamps, postage meter stamps, postage validation imprinter (PVI) label, or permit imprint. A designated postage area 490 alongside the "I" 450 is reserved for placement of the postage. In addition, the postage indicia disclosed in U.S. patent application Ser. No. 09/990,605, filed Nov. 20, 2001, may be used in the area 490 as well as the postage marks and indicia disclosed in U.S. Pat. No. 5,319,562, U.S. Pat. No. 5,341,505, and the other U.S. Patents and U.S. Patent Applications incorporated by reference.

Figure 7:
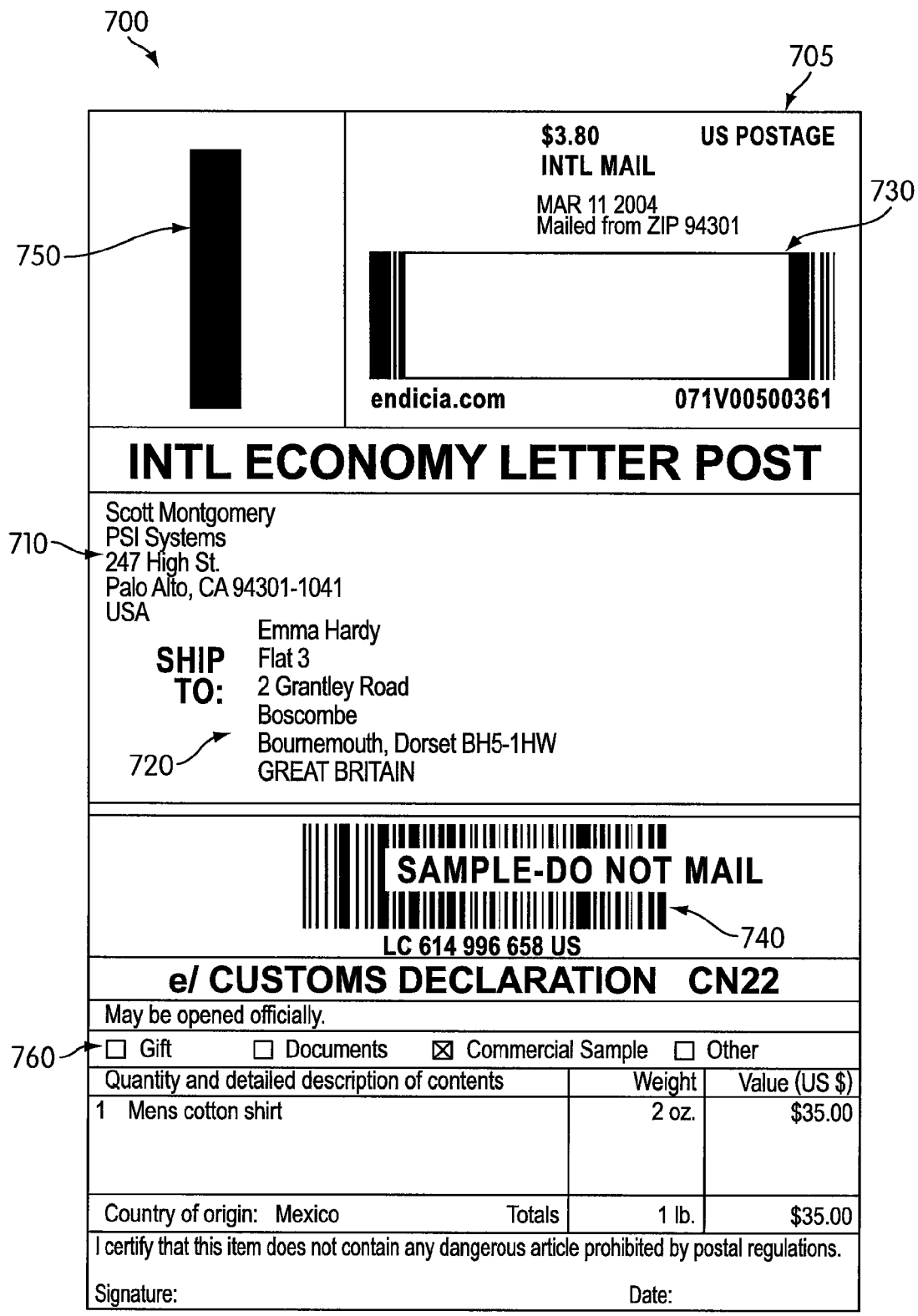
FIG. 7 depicts an exemplary embodiment of an integrated shipping label.

FIG. 7 depicts a preferred embodiment of an integrated shipping label 700 having both customs information as well as postage indicia 705. The sender's 710 and recipient's 720 address appear in the center of the label 700. The sender's 710 address is generally left justified and preferably automatically populates "USA" in bold capital letters. The recipient's 720 address's destination country is also bolded with large font. A two-dimensional barcode 730 includes digitally-signed data which includes among other things the sender's USPS meter account number, origin ZIP code, postage date, and postage amount. Preferably, the customs form number (or significant digits from this number) is also embedded into the postage indicia 705, which can then be used as a unique identifier linked to the postage transaction. The customs form number is also represented by a one dimensional barcode 740. Because the barcode 730 includes the senders USPS meter account number, the international shipment may advantageously be traced back to the sender.

The systems and methods described herein allow the integration of heretofore disparate subcomponents used to ship packages from the United States to foreign countries into a single, integrated label combining digital postage, addressing, and customs form information. Furthermore, the systems and methods include the transfer of package data to a centralized and secure data storage cluster so that all data associated with a given package (sender, recipient, sub-class of mail, package contents, and valuation) can be aggregated in an easily accessed data repository. These data can be used to expedite the flow of goods through foreign customs operations, assist in the tracking of packages, enhance the security and safety of the common carriers transporting these packages, and assist law enforcement agencies both in the US and abroad to investigate potential criminal or terrorist activity.

The ability to produce such a shipping label also represents a tremendous time savings for international shippers since the addressing, postage payment and customs form preparation become integrated. These systems and methods can also be extended to manage postage discount programs (which are common in the United States for certain sub-classes of International mail). Discount programs managed via the embodiments described herein can be administered at lower costs and reduce US Postal Service financial losses due to the elimination of induction accounting errors and omissions common with permit-based mailing programs.

Figure 8:
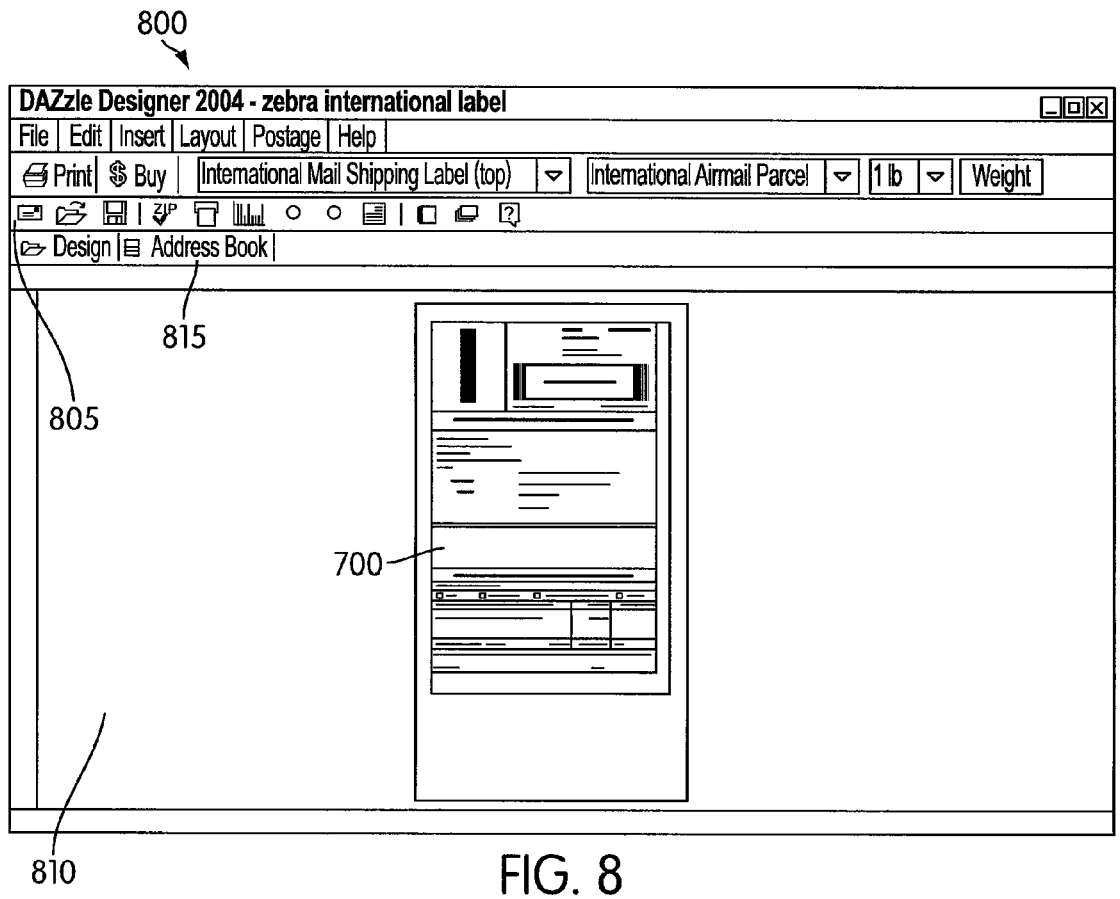
FIG. 8 depicts an exemplary embodiment of a user interface.

These systems and methods leverage the features of a centralized online postage system (such as that described in U.S. Pat. No. 6,005,945 and described above) which allows for the real-time capture of data associated with a postage transaction. Mailing software utilized by the online postage system can be implemented to allow a user to generate an integrated label 700 having the addressee information, the appropriate postage, and customs information. An example user interface 800 for such mailing software is shown in FIG. 8. The user interface 800 includes a workspace 810 that allows a user to design an integrated label 700. Further included is a toolbar 805 that provides tools such as "save," which allows a user to save a design on a non-volatile memory and "file open," which allows a user to open a saved design. Also included is an "address book" 815 that allows a user to store a plurality of addresses to be readily merged with the designed shipping label 700.

Figure 9A:
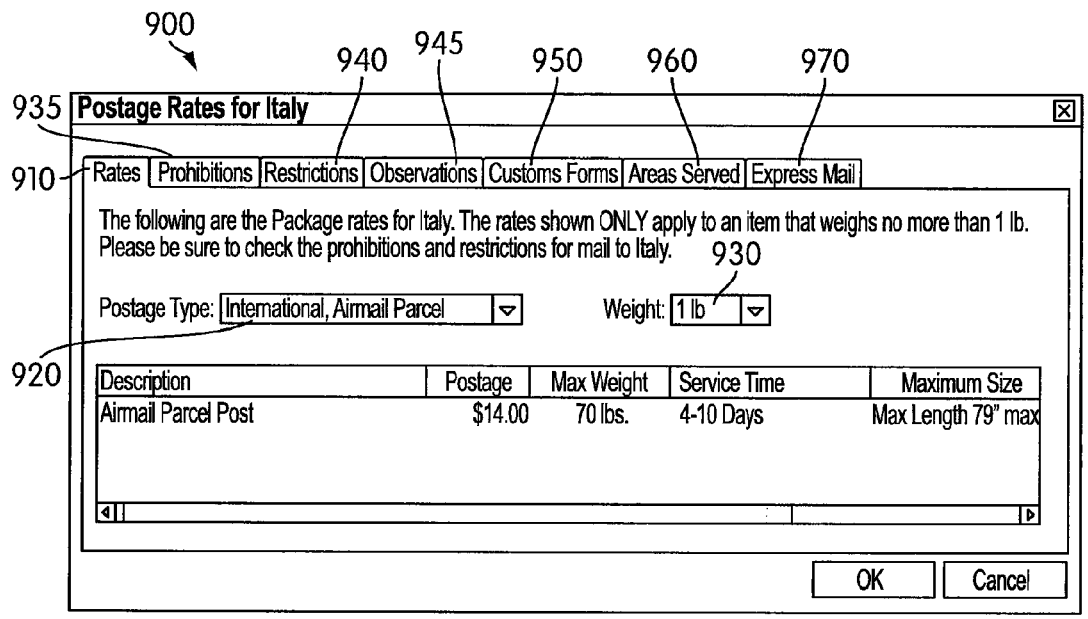
FIG. 9a depicts an exemplary embodiment of a user interface.

The mailing software further includes helper screens 900, as shown in FIG. 9, which are configured to assist the user in, among other things, determining the correct amount of international postage, import restrictions to the foreign country, and customs form requirements for the shipping label 700. As shown in FIG. 9a, a helper screen 900 provides a user with a plurality of tools to establish postage rates for an international location, such as Italy 910. The screen 900 allows a user to establish postage type 920, e.g., airmail, high priority, etc. and weight 930. The postage rate may then be calculated based on the user's established information. Also included are tools for restrictions 940, prohibitions 935, observations 945, customs forms 950, areas served 930, and express mail service 970 as would be appreciated by those skilled in the art.

Figure 9B:
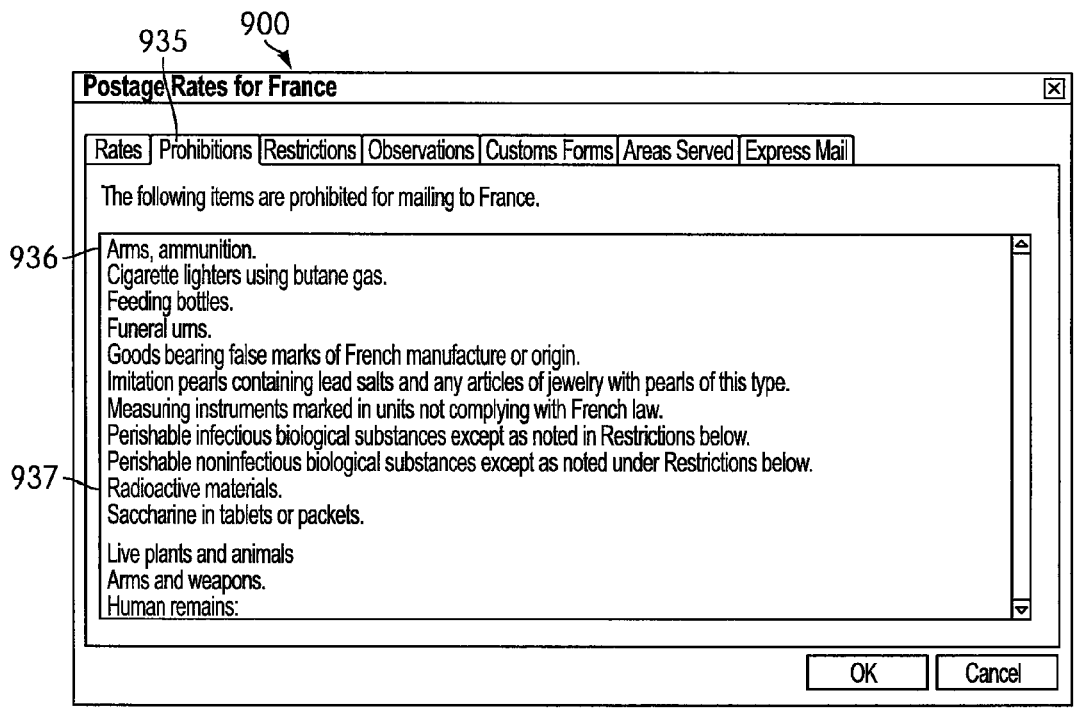
FIG. 9b depicts an exemplary embodiment of a user interface.
Figure 9C:
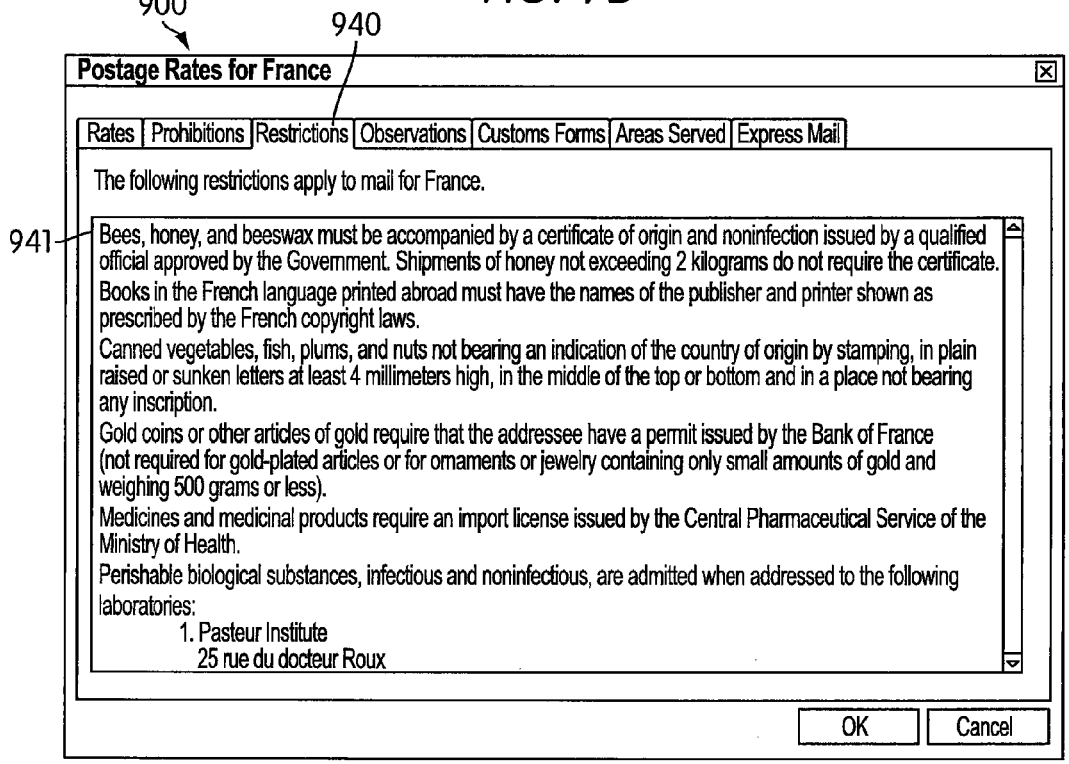
FIG. 9c depicts an exemplary embodiment of a user interface.

Turning to FIG. 9b, the prohibitions tool 935 of the user interface 900 is shown. The tool 935 shows a list of goods 936 prohibited for mailing to a particular country, e.g., France. Turning to FIG. 9c, the restrictions tool 940 of the user interface is shown. The tool 940 shows a list of restrictions 941 that apply to mail to a particular country, e.g., France. This information is generally provided by the destination country and disseminated by the USPS to international shippers. Historically, this information has been available in printed catalogs. Recently, this information has been made available electronically. The user interface 900 utilizes the electronic information.

Figure 10:
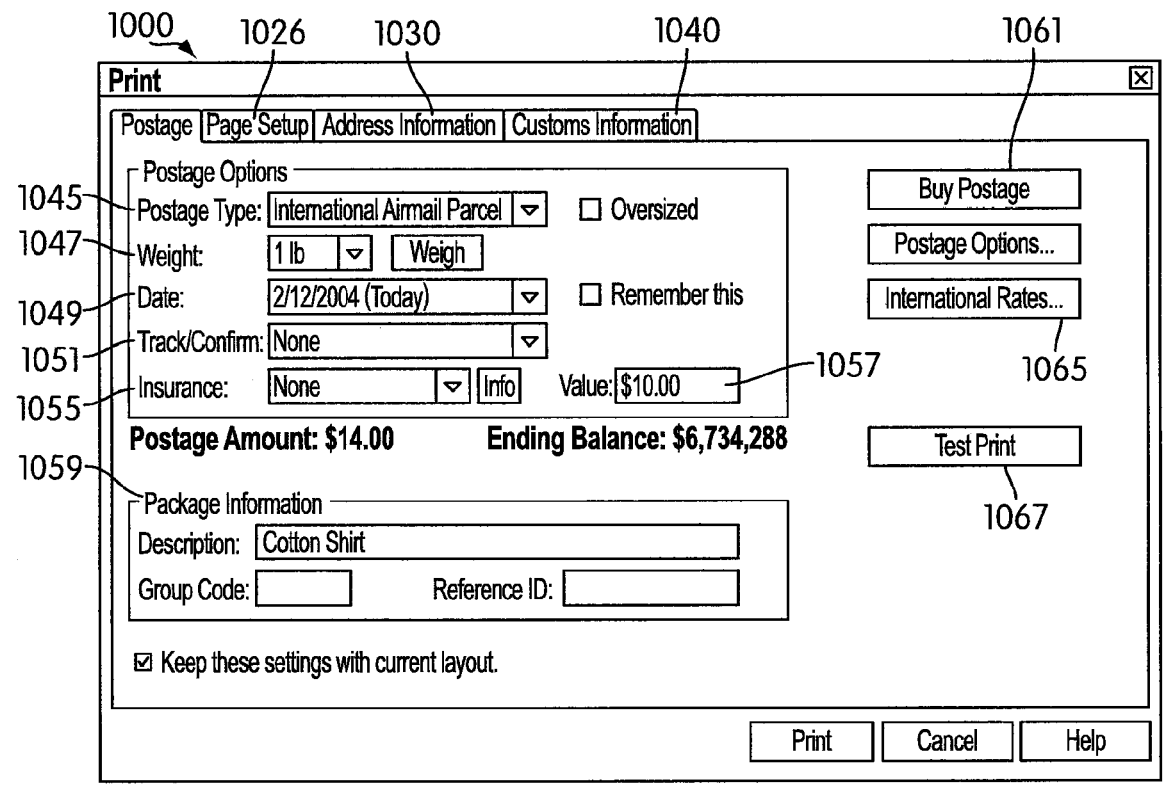
FIG. 10 depicts an exemplary embodiment of a user interface.

Turning to FIG. 10, another user interface 1000 of the mailing software is shown for establishing and printing an integrated shipping label 700. The user interface 1000 allows a user to establish postage type 1045, weight 1047, date 1049, track option 1051, insurance 1055, and value 1057. The user interface 1000 also allows a user to purchase the postage 1061, international rates 1065, and print a test label 1067. The user interface 1000 further allows a user to provide package information 1059, such as description of package. Other tools within this user interface include page setup 1026, address information 1030 and customs information 1040.

Figure 11:
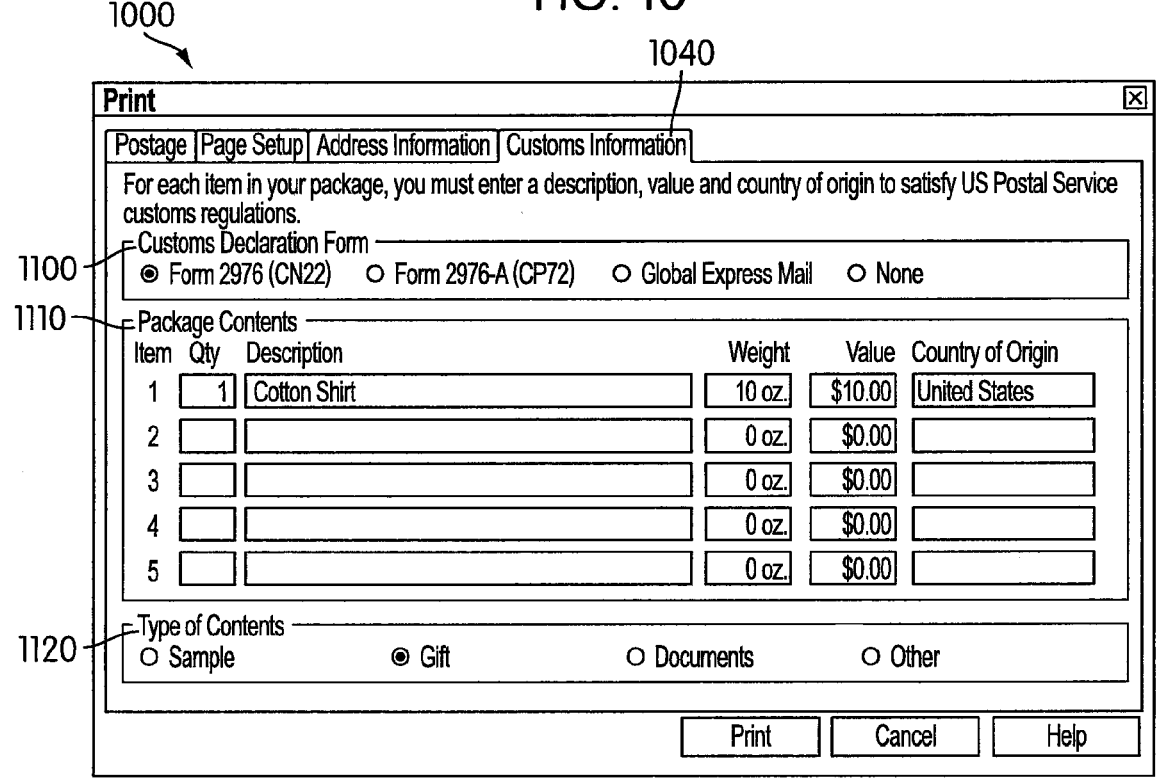
FIG. 11 depicts an exemplary embodiment of a user interface.

Turning to FIG. 11, the customs information 1040 tool of the print user interface 1000 is shown. The customs information tool 1040 allows a user to select the proper form 1100, provide a description of the contents 1110, and select the type of contents 1120, e.g., sample, gift, documents, or other.

By using the postage indicia 705 described above in the universal shipping labels 700, which are generated by the online postage system described above, each label printed can have an associated data record stored at a central location. In the case of domestic packages, the data includes the complete destination address, complete sender information, tracking or delivery confirmation number, package weight, postage applied, and mail class (e.g., Priority). In the case of an international package, the data is expanded to include a description of contents, the value of the contents, and the country of origin for the goods. Furthermore, all of this data is indexed by a unique identifier—the customs form number.

This approach alleviates the need for the 30 day storage of a customs form hardcopy at the origin Post Office. In the existing system, if the information is needed, the origin Post Office must be located, contacted and a manual search for the information must be instituted. These Systems and methods provide a simple index lookup procedure which can be accessed by the Internet, e.g., via a Web browser. By entering a unique identifier, e.g., the customs form number, data about the sender and the package shipped by the sender as well as package status may be retrieved. This type of information can be used by customs personnel (in the US and in foreign countries), by air transportation coordinators, and law enforcement to further advance the safety of commercial shipping.

To achieve some measure of standardization in customs-related information globally, the Universal Postal Union ("UPU") has developed a numerical "harmonization" table which maps products into numerical codes called "HS" codes. The US and other countries have been moving towards requiring shippers to provide both product description and HS code as part of the customs form information. However, the HS requirement may create a burden on those unfamiliar with the codes. A lookup mechanism may be added to the mailing software that allows the determination of the appropriate HS code. Turning to FIG. 12a, a user interface 1200 that allows a user to establish the proper HS code is shown. The user interface 1200 provides a text box 1210 that allows a user to perform a text-based search for the proper HS code, provided in a list box 1220. For example, typing the two words "cotton" and "shirt" in the text box 1210 institutes a Boolean search through the HS database to find all occurrences of these two words. Note that customs organizations make a distinction between, e.g., cotton shirts and shirts made of other materials. Similarly, there is a distinction between men and women's shirts, a night shirts. Wheeled toys are considered to be distinct from general toys.

This simplified lookup process can be integrated into the mailing software when a user is filling out the contents descriptions. In this way the user can be forced to choose amongst standardized descriptive text, rather than typing in free-form (and potentially incorrect or vague) information. In the alternative, the lookup process may be used as an adjunct or an option to a free form goods description. Recording contents data by HS number rather than by free form text also has benefits in reducing the data storage requirements for historical shipment information stored at the centralized postage server site.

Turning back to FIGS. 9b and 9c, the list of prohibited 936 and restrict 941 goods may pose difficulty for a user attempting to compare the list to the description of the actual item being shipped by the user. An approach to alleviate this task is to recast the lists 936 and 941 into their corresponding HS code or HTS numbers. For example, for radioactive materials 937 in the list of prohibited goods 936, the corresponding HTS number is 28444000. Turning to FIG. 12b, the user interface 1200 is shown with a search done of "radioactive" materials 1230. The search results 1240 reveal that there is only one HIS number that corresponds with such type of goods. Also shown is a search done of "bees" 1250. The search results 1255 reveal that there are multiple entries. Any of these entries may trigger a warning message to the user, instructing the user that there are restrictions/prohibitions in place for such type of goods being sent to the desired country.

If the prohibitions and restrictions are cast in terms of HIS numbers for each country, the mailing software can enforce the prohibitions and issue warnings for restricted items. This can be achieved by requiring that descriptions be selected from a searchable HIS list and not typed free-form, and then the selected HTS numbers could be compared to the list of restricted and prohibited HTS numbers for the country of interest. The software can provide a hard lock-out—preventing the user from printing the shipping label and accompanying customs form—or issue warning messages of varying severity.

There are a number of advantages in an international shipping system which fundamentally operates using the HTS numbers. First, language barriers are eliminated at foreign customs operations. A Bulgarian customs official may not be very well versed in English, but he/she will know the international HTS numbers relevant to his country intimately.

Second, the use of HIS numbers offers the shipper an automated software-based means to insure they are not inadvertently shipping restricted or prohibited goods to foreign countries. For such goods, there is no guarantee the goods will be returned to the shipper. Thirdly, the use of HTS numbers provides a convenient and uniform way to construct electronic manifests of what goes on any aircraft of ship. This is significant given the current geo-political situation.

As described above, the online postage system can transmit the detailed list of items (including HTS) number about a shipment to both the central postage services and those of the USPS using the customs form number as an index for this detailed data. Thus, scanning a customs form barcode created by systems described above will allow for an instantaneous lookup of all the items in that package including the HTS code for each item.

The systems and methods described herein also provide for the management of USPS and other post service discount programs. Certain international subclasses of mail—namely Global Express Mail—offer discount programs for volume mailers. International mail is the only mail the USPS has freedom to negotiate rates on—domestic rates are locked by a complete Postal Rate Commission process. Currently, the USPS administers the international discount program in an inefficient and expensive way. The USPS discounts range from 5% to 12% depending upon annual package volume. The USPS administers this process through a permit-based accounting scheme. In addition to the potential for revenue loss at induction as described above, the discount program requires additional accounting and management by USPS personnel. Discounts are based on estimated volumes, not actual volumes, and the discount schedule can therefore be out of synch with actual mailer's shipment activity.

The systems and methods described herein provide a means of managing such discount programs on behalf of the USPS. A centralized online postage vendor collects funds prior to postage consumption by credit card, ACH direct debit, or commercial check. Mailers "draw down" on their account balance as they print postage labels. A discount program administered in this environment may provide the following advantages: each package bears full rate postage for the destination country and weight; there is no revenue loss at induction since this is prepaid postage and not a permit-based system; discounts can be applied after the fact, reflecting the actual performance of the shipper and not estimate volumes; discounts can be inexpensively applied as "electronic credits" to the mailer's existing postage meter account; and USPS auditors and the USPS Inspection Service have access to detailed package-by-package accounting for all discount program participants.

Volume mailers often use USPS permit account as a means to pay for international shipments. With such mailers, a permit number and city/state of issue replace the live digital postage indicium. While historically convenient for the mailer, this approach is prone to revenue loss by the USPS. The USPS staff must be careful to make full note of all permit mail inducted. Failure to do so will result in the USPS assuming responsibility for delivering the package without drawing funds from the mailer's permit account. USPS losses due to induction failures of this nature are estimated to be on the order of 1-3% of total permit revenue.

These systems and methods described herein provide the mailer with the printing convenience of a permit while simultaneously assuring the USPS of receiving the associated revenue. By printing live online postage from an active USPS meter account, there is no need for induction accounting at the Post Office and therefore no associate revenue loss. Further, the USPS and mailer save the time and expense of a face-to-face induction process. The completely prepaid packages can be picked up by a USPS carrier during normal rounds or quickly dropped off at any USPS facility.

USPS shipping labels differ from other carriers' labels in that they represent negotiable US funds. If a hardware or software error causes this print cycle to fail, the associated dollar amount of the label is potentially lost to the mailer. Unless properly addressed, these losses can drive a shipper away from USPS as a carrier into competing carriers such as FedEx or UPS who have a different billing scheme.

The systems and methods described herein provide a refund protocol for domestic mail labels that carry some form of delivery confirmation or tracking barcode. The documents incorporated by reference describe a means by which data stored by the centralized postage cluster in conjunction with USPS delivery scan information to determine if end-user refund requests are reasonable. International shipping labels have been problematic in this regard because only a very limited subset of USPS International mail is tracked—specifically the relatively expensive Global Express Mail and Global Express Guaranteed services. Not only are these services expensive, they are offered for only a limited number of foreign countries. In point of fact, the vast majority of US-originating mail to foreign countries is not tracked in anyway.

These systems and methods bond a unique customs form ID to a postage transaction. Due to security requirements, all international packages over 1 lb must carry a customs form, and furthermore all customs forms must be scanned and "round-stamped" by USPS personnel at acceptance. The round stamp is an indication to downstream mail processing facilities (the approximately ten USPS International Service Centers located on US soil which manage all foreign outbound mail) that a local post office authority has accepted the package in either a face-to-face transaction, or via a secure protocol where the mailer is identified as a "known-mailer."

The customs form barcode number, which is scanned at the origin post office, is transmitted nightly via the USPS internal network to a USPS database referred to as "GoldMine"—currently located in the Eagan, Minn. Postal Data Center. GoldMine data includes the date and time of the induction scan, the origin zip code of the Post Office, the package weight (as confirmed by measurement by USPS staff), the destination country, the mail class and the International Service Center (ICS) which will handle this package.

Figure 13:
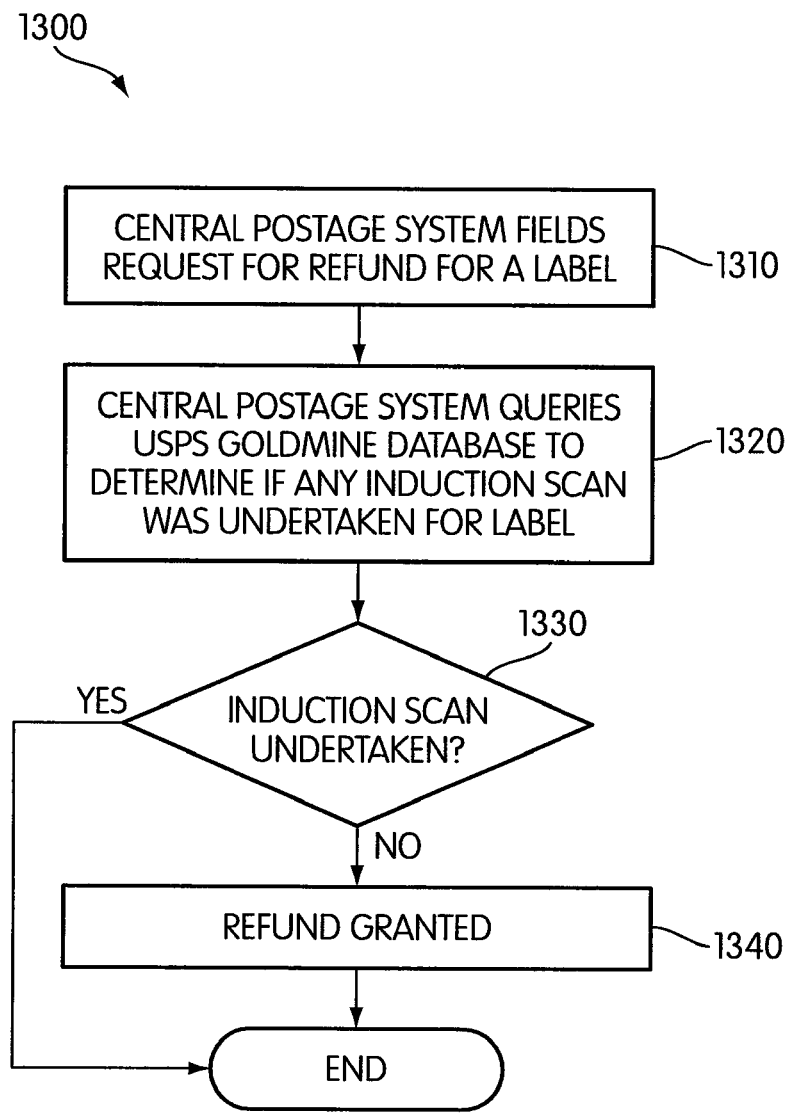
FIG. 13 is a process in accordance with one embodiment of the present invention.

The Goldmine database has been used little if at all by USPS in past years. These systems and methods allow the use of this USPS database and similar other databases as a means to authenticate refund requests on international shipping labels featuring an integrated customs form and customs form ID. While the USPS Goldmine database is on an internal network, all USPS approved online postage vendors also have access to this network. The refund procedure 1300 is illustrated in FIG. 13. A mailer (end-user) would request a refund for a given mailing label with associated customs form ID. The request would be fielded by the centralized postage system on behalf of the USPS (action block 1310). The postage system would query the USPS Goldmine database for a reasonable time frame (e.g., two weeks) to see if any induction scan had been undertaken for that label (action block 1320). If no induction scan was recorded by the Goldmine database after the time period expired (decision block 1330), the refund would be granted (action block 1340). Additional audit controls can be installed to track refund trends with a given user to detect systematic abuse of the refund request process.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for generating an integrated international shipping label and customs form, comprising:
   receiving, at a computer, shipping information associated with an international mail piece, wherein the shipping information includes one or more of an origin address and a destination address associated with the international mail piece;
   receiving, at the computer, customs information that includes a description associated with one or more items to be shipped in the international mail piece; and
   generating, by the computer, a postage payment indicium corresponding to the international mail piece, a customs form tracking number, and an international shipping label that integrates (1) the shipping information, (2) a plain text customs declaration form, (3) the postage payment indicium corresponding to the international mail piece, and (4) the customs form tracking number,
   wherein the plain text customs declaration form includes one or more fields populated with the description associated with the one or more items to be shipped in the international mail piece,
   wherein the customs form tracking number is logically linked to the postage payment indicium.

2. The method of claim 1, wherein the plain text customs declaration form further includes the one or more fields populated with a quantity, a weight, a country of origin, and a value associated with the one or more items to be shipped in the international mail piece.

3. The method of claim 1, wherein the plain text customs declaration form further includes the one or more fields populated with one or more Harmonized System Tariff Numbers that represent the one or more items to be shipped in the international mail piece.

4. The method of claim 3, wherein the one or more Harmonized System Tariff Numbers include one or more six digit numbers that represent the one or more items in an international Harmonized Tariff Schedule.

5. The method of claim 3, wherein the description associated with the one or more items includes one or more Boolean search terms that the computer uses to identify the one or more Harmonized System Tariff Numbers that represent the one or more items to be shipped in the international mail piece.

6. The method of claim 1, further comprising:
   providing a warning message to a mailer associated with the international mail piece in response to determining that a destination country associated with the destination address has import restrictions that apply to the one or more items; and
   preventing the mailer from printing the international shipping label in response to determining that the destination country has the import restrictions that apply to the one or more items.

7. The method of claim 1, further comprising providing a warning message to a mailer associated with the international mail piece in response to determining that a destination country associated with the destination address has import restrictions that apply to the one or more items.

8. The method of claim 1, further comprising preventing a mailer associated with the international mail piece from printing the international shipping label in response to determining that a destination country associated with the destination address has import restrictions that apply to the one or more items.

9. The method of claim 1, further comprising storing, in a database, an electronic record that indexes the international shipping label with a unique identifier associated with the plain text customs declaration form.

10. The method of claim 1, wherein generating the international shipping label that integrates the shipping information, the plain text customs declaration form, and the postage area includes:
  processing funds associated with the international shipping label from an account that a customer has with a postage vendor, wherein the customer pre-pays the a postage payment indicium associated with the international mail piece with the funds processed from the account that the customer has with the postage vendor;
  applying a discount to the pre-paid postage payment indicium associated with the international mail piece in accordance with a post service discount program; and
  crediting the discount applied to the pre-paid postage payment indicium associated with the international mail piece to the account that the customer has with the postage vendor.

11. The method of claim 10, wherein generating the international shipping label that integrates the shipping information, the plain text customs declaration form, and the postage area further includes:
  receiving a refund request associated with the international shipping label;
  querying a database to determine whether an induction scan associated with the international shipping label has been undertaken; and
  granting the refund request in response to determining that the induction scan associated with the international shipping label has not been undertaken, wherein granting the refund request includes crediting the pre-paid postage payment indicium associated with the international shipping label to the account that the customer has with the postage vendor.

12. A non-transitory computer readable storage medium containing computer-executable instructions that, when executed on a processor, cause the processor to generate an integrated international shipping label and customs form comprising:
  a postage payment indicium corresponding to the international mail piece;
  an origin address associated with the international mail piece;
  a destination address associated with the international mail piece; and
  a plain text customs declaration form having one or more fields that a computer system automatically populates with a description associated with one or more items to be shipped in the international mail piece; and
  a customs form tracking number,
  wherein the customs form tracking number is logically linked to the postage payment indicium.

13. The computer readable storage medium of claim 12, wherein the plain text customs declaration form further includes the one or more fields automatically populated with a quantity, a weight, an origin country, and a value associated with the one or more items to be shipped in the international mail piece.

14. The computer readable storage medium of claim 12, wherein the plain text customs declaration form further includes the one or more fields automatically populated with one or more Harmonized System Tariff Numbers that represent the one or more items to be shipped in the international mail piece.

15. The computer readable storage medium of claim 14, wherein the one or more Harmonized System Tariff Numbers include one or more numbers that represent the one or more items in an international Harmonized Tariff Schedule.

16. The computer readable storage medium of claim 14, wherein the description associated with the one or more items includes one or more Boolean search terms that the computer system used to identify the one or more Harmonized System Tariff Numbers that represent the one or more items to be shipped in the international mail piece.

17. The computer readable storage medium of claim 12, wherein the computer-executable instructions, when executed on the processor, further cause the processor to:
  provide a warning message to a mailer associated with the international mail piece if a destination country associated with the destination address has import restrictions that apply to the one or more items; and
  prevent the mailer from printing the international shipping label if the destination country has the import restrictions that apply to the one or more items.

18. The computer readable storage medium of claim 12, wherein the computer-executable instructions, when executed on the processor, further cause the processor to provide a warning message to a mailer associated with the international mail piece if a destination country associated with the destination address has import restrictions that apply to the one or more items.

19. The computer readable storage medium of claim 12, wherein the computer-executable instructions, when executed on the processor, further cause the processor to prevent a mailer associated with the international mail piece from printing the international shipping label if a destination country associated with the destination address has import restrictions that apply to the one or more items.

20. The computer readable storage medium of claim 12, wherein the computer-executable instructions, when executed on the processor, further cause the processor to store, in a database, an electronic record that indexes the international shipping label with a unique identifier associated with the plain text customs declaration form.

21. The computer readable storage medium of claim 12, wherein the computer-executable instructions, when executed on the processor, further cause the processor to:
  process funds associated with the international shipping label from an account that a customer has with a postage vendor, wherein the customer pre-pays the postage payment indicium associated with the international mail piece with the funds processed from the account that the customer has with the postage vendor;
  apply a discount to the pre-paid postage payment indicium associated with the international mail piece in accordance with a post service discount program; and
  credit the discount applied to the pre-paid postage payment indicium associated with the international mail piece to the account that the customer has with the postage vendor.

22. The computer readable storage medium of claim 21, wherein the computer-executable instructions, when executed on the processor, further cause the processor to:
  receive a refund request associated with the international shipping label;
  query a database to determine whether an induction operational scan associated with the international shipping label has been undertaken; and
  credit the pre-paid postage payment indicium associated with the international shipping label to the account that the customer has with the postage vendor to grant the refund request if the operational scan associated with the international shipping label has not been undertaken.

* * * * *